United States Patent [19]

Washkewicz et al.

[11] 4,384,595
[45] May 24, 1983

[54] HOSE CONSTRUCTION

[75] Inventors: Donald E. Washkewicz, Aurora; John R. Greco, Ravenna, both of Ohio

[73] Assignee: Parker-Hannifin Corporation, Cleveland, Ohio

[21] Appl. No.: 301,625

[22] Filed: Sep. 14, 1981

[51] Int. Cl.³ .............................................. F16L 11/00
[52] U.S. Cl. .................................... 138/127; 138/125; 138/124; 428/36
[58] Field of Search ............... 138/124, 125, 126, 127, 138/130; 428/36

[56] References Cited

U.S. PATENT DOCUMENTS

| 3,022,802 | 2/1962 | Lewis | 138/125 |
| 3,905,398 | 9/1975 | Johansen et al. | 138/124 |
| 3,948,293 | 4/1976 | Bixby | 138/126 |
| 3,997,440 | 8/1976 | Phillippi | 138/125 |

FOREIGN PATENT DOCUMENTS 2443271  4/1975  Fed. Rep. of Germany .

OTHER PUBLICATIONS

U.S. Ser. No. 790,284, Abandoned, Busdiecker et al., filed 4-5-75.

Primary Examiner—William R. Dixon, Jr.
Attorney, Agent, or Firm—Joseph B. Balazs

[57] ABSTRACT

A high strength flexible hose for conveying fluids under pressure wherein the hose includes a synthetic thermoplastic polymeric core tube, one or more inner reinforcing layers of a high strength aramid yarn having a section modulus of over 400 grams per denier and a tenacity of more than 15 grams per denier at room temperature, and one or more outer reinforcing layers of metal wire.

14 Claims, 3 Drawing Figures

HOSE CONSTRUCTION

BACKGROUND OF THE INVENTION

1. Field of the Invention

This invention relates to flexible hydraulic hose, and more particularly to hydraulic hose that can withstand high pressure, maintain flexibility, resist kinking, is economical to produce, and is resistant to cut through and burn through.

2. Description of the Prior Art

Flexible hoses made of elastomeric or flexible plastic materials require reinforcement by material such as braided, helically wound, or knitted filaments of rayon, Dacron, steel wire, or the like when the hoses are to be used for conveying fluids under high pressure, such as hydraulic pressures over 1,000 psi. More than one layer of reinforcement material is often required to provide the burst strength needed for high pressure applications.

When two or more layers of reinforcement material are used, several problems arise. If a fibrous non-metallic material such as Nylon 6/6, Dacron, rayon or the like is used as the reinforcement material, there may be substantial elongation of the reinforcement material filaments and expansion in hose diameter when the hose is under pressure. These fibrous non-metallic materials impart a reduced level of strength when compared to steel wire. In addition, a hose using these reinforcement materials is not always sufficiently resistant to kinking, cut through by sharp objects or burn through by flame or heat.

In contrast, if metal wire is used as the reinforcement material, the hose is highly resistant to kinking, cut through, and burn through. However, when multiple metal wire layers are used as reinforcement material the use of a buffer layer of thermoplastic or elastomeric material is typically needed to act as a cushion to resist abrasion of the wire layers during pressure loading, thus adding to manufacturing cost and complexity. Still another problem with multiple metal wire braid hose is pinhole type failures during high pressure impulse occurrences.

Another approach has been suggested to use a hose structure using a reinforcement comprising two layers of an aromatic polyamide or "aramid" yarn that is available from the E. I. duPont de Nemours Company under the trademark Kevlar and which was formerly designated by duPont as Fiber B Nylon. The layers of Kevlar would replace the other reinforcement layers used in the prior art. The use of two layers of Kevlar reinforcement would result in a relatively flexible hose having a very high burst strength and which can dissipate some shock pressures without causing system sluggishness. This hose construction, however, suffers from the fact that it is not resistant to cut through and has reduced kink resistance. Additionally the Kevlar yarn is relatively brittle and also expensive.

SUMMARY OF THE INVENTION

The present invention provides a solution to the aforementioned problems of hose strength, flexibility, dissipation of hydraulic shocks, and resistance to kinking, cut through, and burn through as well as providing economic, reliable manufacture while retaining a minimal outside diameter for the hose. This is accomplished by providing a hose with a core tube, one or more layers of Kevlar reinforcement material about the core tube, and one or more layers of metal wire reinforcement over the Kevlar reinforcement. In most instances it will also be desirable to provide a sheath of synthetic thermoplastic polymeric or elastomeric material over the wire reinforcement. The inner Kevlar reinforcement layer or layers provide 3% to 40% of the total strength of the finished product.

DESCRIPTION OF THE PREFERRED EMBODIMENTS

Figure 1:
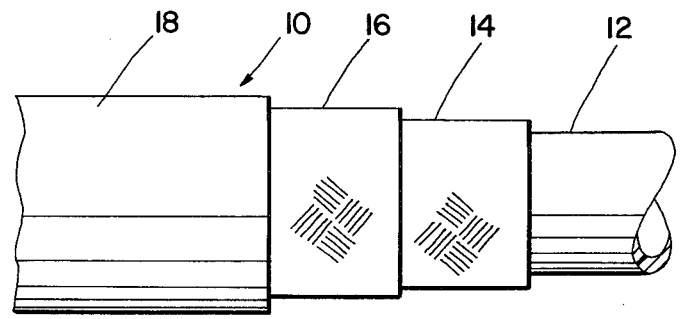
FIG. 1 is a side view, partly broken away in successive structural layers, of a hose made in accordance with the present invention having a first or inner layer of a braided Kevlar reinforcement and a second or outer layer of a braided metal wire reinforcement.

FIG. 1 illustrates a hose 10 having a core tube 12 of thermoplastic polymeric material or vulcanizable elastomeric material, a first or inner reinforcement layer 14 of braided Kevlar, a second or outer reinforcement layer 16 of braided metal wire, and an outer sheath 18 of synthetic thermoplastic polymeric or elastomeric material. The material utilized to form the core tube 12 and the outer sheath 18 may be selected from any of the well-known synthetic thermoplastic polymers or vulcanizable elastomers used in the hose industry to produce reinforced hoses, such as nylon 6/66, nylon 11, Hytrel ® (trademark of E. I. duPont de Nemours Company), polyurethane, polyethylene, chloroprene or the like. In any event, the material selected for the outer sheath 18 may be the same or different from the material chosen for the core tube 12.

Accordingly, this design provides a hose with burst strength similar to standard two metallic wire braid hoses (e.g. SAE 100R2 Hose) while providing the unique advantages of not needing a buffer layer between braids, eliminating pinholing problems and minimizing hose diametral size for efficient design. These advantages are all present in this hose which is reliable in operation and economical to produce.

Kevlar has a modulus of elasticity of between 400 and 500 grams per denier, a tenacity of more than 15 grams per denier at room temperature, and an elongation at break of about 4%. Its density is between 1.40 and 1.50 and it has a tensile strength of about 405,000 psi. Because of these characteristics, the Kevlar reinforcing layer can support a significant portion of the intended service load while requiring normally less than 100% coverage of the core tube. This is possible due to the high modulus of Kevlar in comparison to polyester, nylon and the like, which enables it to be stressed at low strain levels. This is important in that the wire reinforcement which exhibits an elongation at break of less than 2% does not expand readily when the hose is pressurized, requiring any reinforcement which is used in conjunction with it to do likewise, thus insuring load sharing.

Figure 2:
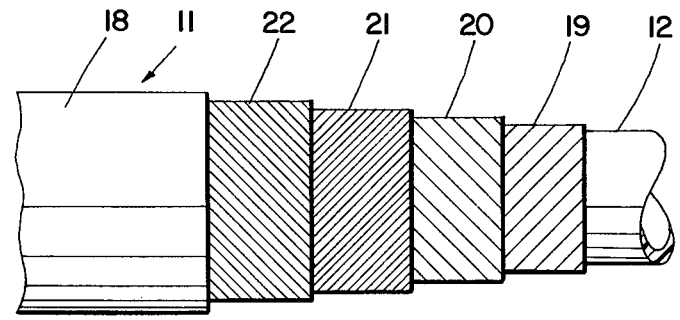
FIG. 2 is a side view, partly broken away in successive structural layers, of another embodiment of a hose having two inner layers of spirally wound Kevlar reinforcement and two outer layers of spirally wound wire reinforcement.

The Kevlar reinforcing layer 14 although illustrated in braided form, alternatively may be spirally wound, as in FIG. 2, or knitted. When in the form of a braid or spirally wound, it may be applied to the core tube 12 at an angle between 48° and 56°. In the preferred embodiment of the invention, reinforcing layer 14 is applied at the neutral angle of 54°-44′ or at an angle slightly less than the neutral angle so that this layer of reinforcement will contract slightly in length and expand in diameter as pressure is applied to the interior of the hose. The second reinforcing layer 16 is composed of metal wire and may also be applied in the form of a braid or spirally wound but at an angle between 50° and 58°. In the preferred embodiment of the invention, reinforcing layer 16 is applied at the neutral angle or at an angle slightly greater than the neutral angle so that this layer of reinforcement will tend to elongate and contract in diameter as pressure is applied to the interior of the hose. The resulting effect is an efficiently loaded composite hose structure wherein both reinforcing layers share the load.

In a preferred embodiment the inner braid of Kevlar does not supply 100% coverage and typically a coverage of between 20% and 90% is used. That is, the Kevlar is applied with spaces between adjacent strands of the material. In this embodiment the Kevlar still provides between 3% and 40% of the total strength of the product. It has been found that by allowing the Kevlar layer to share less than about 40% of the load, pinhole type failures can be minimized. By allowing the Kevlar braid to accept less than 40% of the load it is possible to minimize buckling of the Kevlar braid during the wrapping of the outer wire braid, which is done under very high tension, and also maintain the wire braid in close proximity to the core tube due to the thin Kevlar layer. This buckling effect due to a thick Kevlar braid, one which is designed to contribute greater than about 40% of the strength of the finished product, results in areas of the tube being relatively unsupported and thus more apt to result in pinhole type failures of the core tube.

The Kevlar reinforcing layer 14 may or may not be adhesively bonded to the core tube 12 and the wire reinforcing layer 16 may or may not be bonded to the Kevlar reinforcing layer 14 and/or the sheath 18. However, in one preferred embodiment of the invention, there is no adhesive bond between the Kevlar reinforcing layer 14 and the wire reinforcing layer 16.

The wire selected for the wire reinforcing layer 16 may be any one of a number of different wire types used in the hose industry for reinforcing material. For example, carbon steel or stainless steel wire can be used. The carbon steel wire would be very similar to SAE 1065 or SAE 1070 wire, and would have a tensile strength of about 350,000 psi for a typical 0.012 inch diameter wire. The wire is conventionally brass electroplated. The stainless steel wire would be similar to Type 302 stainless steel which has a tensile strength of about 325,000 psi for a typical 0.012 inch diameter wire. Both of these carbon steel and stainless steel wires have an elongation at break of about 1%.

The Kevlar yarn imparts greater radial and axial dimensional stability to the hose when subjected to fluid pressure than hoses having reinforcement layers of Nylon 6/6, Dacron, rayon and other non-metallic fibrous materials heretofore used because it has a substantially higher tensile modulus of elasticity than the aforementioned synthetic fiber reinforcing materials. Additionally the Kevlar layer with its high tensile strength provides better protection for the core tube without significantly increasing the dimension or reducing the flexibility of the hose and shares the load with the outer reinforcing layer. As shown by test results in Table I below unexpected superior results are obtained when the inner Kevlar layer does not supply 100% coverage or when it is designed to support less than 40% of the load. Pinhole type failures are kept to a minimum even with the use of an economical synthetic thermoplastic polymeric core tube in the hose design. Additionally the outside diameter of the hose is kept to a minimum.

TABLE I

| Example | Theoretical Calculated Burst, psi | Actual Burst (psi) | Impulse* cycles | Hose O.D. with .060″ cover |
|---|---|---|---|---|
| 1. Standard full coverage two-wire braid hose with rubber core tube. (360 lbs/Mft)** | 26,000 | 23,000 | 350,000 No Failure | .780″ |
| 2. Standard full coverage two-wire braid hose with plastic core tube. (318 lbs/Mft)** | 26,000 | 15,000 | 45,000 Pinhole Failures | .725″ |
| 3. 190% coverage inner Kevlar braid and full coverage outer wire braid hose with plastic core tube. (224 lbs/Mft)** | 28,000 | 15,000 | 7,000 Pinhole Failures | .745″ |
| 4. Open Kevlar (37% coverage) inner braid and full outer wire braid hose with plastic core tube. (206 lbs/Mft)** | 20,000 | 17,400 | 430,000 No Failure | .685″ |

*Impulse test conducted in accordance with SAE Specification J517-b for SAE 100R2-6 hose.
**Weight of standard length of hose sample.

Example 1 is an SAE 100R2 ⅜″ I.D. hose which utilizes a heat curable core tube of nitrile, neoprene or the like, 2 layers of braided steel wire reinforcement which are separated by a heat curable insulation layer, and a heat curable outer cover of materials similar to those used for the core tube. This product is the industry standard and is widely used. It can be seen from Table #1 that the theoretical or calculated burst of this product is 26,000 psi or very close to the actual burst of 23,000 psi due to a highly efficient reinforcement design. The burst pressure required by SAE 100R2 is 16,000 psi. This product also performs well during impulse testing, which is an accelerated life test where the hose is cycled between 0 and 133% of rated working pressure until failure occurs. The product ran 350,000 cycles with no failure; the industry requirement is 200,000 cycles. This product, even though it performs well, is heavy, requires numerous manufacturing steps including vulcanization or heat curing, requires mandrel support and results in a product with a relatively large outside diameter, i.e. 0.780″.

Example 2 is similar to Example 1 in that it utilizes two braids of steel wire reinforcement. It differs in that it utilizes a thermoplastic core tube and cover. The advantages of this construction over Example 1 are numerous. First, due to the relatively higher strength core tube in comparison to rubber, a mandrel is not required; also, the core tube can be thinner and yet have comparable strength when compared with rubber. Thus, by utilizing a thinner core tube a smaller overall finished product results. This product also does not require the final processing step of vulcanization. This product does, however, have some deficiencies. From Table #1 it can be seen that the theoretical or calculated burst pressure is about 25,000 psi, which is substantially higher than the actual of 15,000 psi and thus the reinforcement is relatively inefficient in comparison to Example 1. The actual is also lower than the required burst of 16,000 psi. In addition, this product performs poorly when impulse tested. The product fails at about 45,000 cycles with pinhole type tube failures. This can be explained in part by the lack of penetration of the braid into the rigid thermoplastic tube, thus allowing the tube to expand and fatigue at the point of the braid interstices after repeated impulsing. This is in contrast to Example 1 where the tube, when vulcanized, can flow into the braid interstices and thus avoid this type of failure. In addition, the product offers relatively no weight advantage over the industry standard. (Example 1)

Example 3 was an attempt to eliminate the problems of low hose burst, low hose impulse life and pinhole type tube failures while reducing the overall weight and O.D. of the finished product and resisting cut-through, burn-through and the like. This construction utilized a ⅜" I.D. thermoplastic core tube, full bulky braid of Kevlar, >100% coverage, no insulation between braids, outer full wire braid and thermoplastic sheath. It was felt that the Kevlar would lay flatter and in more intimate contact with the core tube and thus eliminate the pinhole tube failure discussed previously. This hose was designed so that the first Kevlar braid would support 16,000 psi and the second wire braid 12,000 psi. Thus the inner Kevlar braid would support about 57% of the total load. Here again, as in Example 2, the actual burst of 15,000 psi was significantly below the calculated burst of 28,000 psi and also below the minimum requirement of 16,000 psi. In addition, the impulse life was 7,000 cycles, compared with a required 200,000 cycles. Again, as in Example 2, the failure mode was pinhole type failures of the core tube. Here, unlike Example 2, the failures were caused by buckling and distortion of the Kevlar reinforcement layer while applying the outer wire braid under high tension. This distortion of the inner Kevlar braid reduced its efficiency in supporting the 57% intended load and allowed the tube to fatigue at the points of distortion.

The tube coverage of the Kevlar braid in this example was approximately 200%. It is possible to achieve a theoretical coverage of greater than 100% since Kevlar, which is made up of fine filaments, will pack tightly when the amount of yarn required for exactly 100% coverage is exceeded. This packing has a tendency to increase the braid diameter. It can be seen from Table I that the weight of this product was considerably lower than either example of the industry standard (Example 1 or Example 2).

Example 4, the instant invention, is similar to Example 3, with the difference being that the amount of Kevlar and thus the coverage of Kevlar over the tube was reduced significantly. As in the previously mentioned examples, this sample was ⅜" I.D. This hose was designed so that the inner Kevlar braid would support about 2,000 psi and the outer wire braid would support about 18,000 psi. Thus, the inner Kevlar braid would support about 10% of the total load.

Here, unlike Example 3 where we utilized a highly packed Kevlar inner braid, our coverage is 37% of relatively open. As can be seen from Table I we were able to overcome the pinhole type failures of Example 2, which were brought about by fatigue of our rigid thermoplastic tube at the interstices of the wire braid and also the pinhole failures of Example 3 which were caused by buckling or distortion of the highly packed inner Kevlar braid while applying the wire braid under high tension. It is felt that the reduced Kevlar content allowed the Kevlar to lay flat against the core tube yet sufficiently support the tube to contribute to the overall strength of the finished product and reduce pinhole type failures. The end result is an efficiently loaded hose which does not require an insulation layer between the Kevlar and the wire and yet exceeds the burst and impulse requirements of SAE 100R2 hose. The hose is light in weight at 206 pounds per 1000 feet and small in overall O.D. at 0.685" when compared to the standard hose (Example 1).

The metal wire reinforcing layer 16 gives the hose structure increased burst strength. In addition, the metal wire imparts added kink resistance to the hose. Also, the outer wire reinforcing layer protects the inner Kevlar reinforcing layer from burn through by a weld splatter or the like which contacts the hose and from cut through from the hose coming into contact with a sharp object.

Another embodiment of the invention is shown in FIG. 2. This hose 11 differs from that shown in FIG. 1 in that the reinforcement is shown in spirally wound form instead of braid and thus there will be two separate layers 19 and 20 of Kevlar and two separate layers 21 and 22 of wire.

Figure 3:
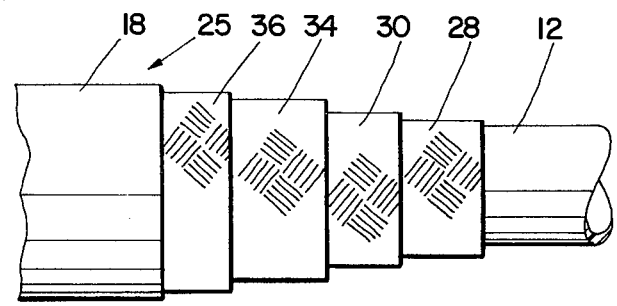
FIG. 3 is a cross section of the wall of a hose of another embodiment of a hose having two inner layers of braided Kevlar reinforcement and two outer layers of braided wire reinforcement.

In the embodiment shown in FIG. 3, hose 25 has a synthetic thermoplastic polymeric core tube 12, a first inner layer of Kevlar braid 28, a second inner layer of Kevlar braid 30, a first outer layer of wire braid 34, a second outer layer of wire braid 36, and a synthetic thermoplastic polymeric or elastomeric outer sheath 18. The Kevlar braid layers 28, 30 and the additional metal wire layers 34, 36 are applied in a manner identical to that previously described for Kevlar reinforcing layer 14 and metal wire reinforcing layer 16 of FIG. 1, respectively. It is to be understood that the Kevlar braids are each preferably applied with less than 100% coverage and or support less than 40% of the total load. Hose 25 may or may not use a buffer layer between wire braids 34 and 36. The resulting hose structure differs from the embodiment shown in FIG. 1 in that it has a substantially higher burst strength due to the additional Kevlar and metal wire layers, and thus can be used where extremely high burst strength is required. Additionally, the use of two layers of braided metal wire reinforcement increases the resistance of the hose to kinking, cut through, and burn through.

In summary the hose construction of the present invention provides many advantages over prior art hoses. The steel wire in the outer layer imparts excellent kink resistance as the wires act like an interlocked spring. Also the steel wire protects the inner high strength Kevlar braid from damage by burn through, cut through or other external abuse. The Kevlar layer provides improved impulse life due to its high strength and intimate contact with the core tube which prevents the core tube from failing due to pinholes. These advantages are not possible with standardly used synthetic fibers such as nylon, Dacron or rayon in combination with steel wire. Additionally, the use of the Kevlar layer with the steel layer does away with the need for a buffer layer as is needed in two metallic wire braid hoses.

We claim:

1. A high burst strength flexible composite hose comprising a flexible core tube, one or more inner layers of fibrous reinforcing material disposed about said core tube having a contribution to the total strength of the composite of between 3% and 40%, said one or more inner layers of fibrous reinforcing material being applied with spaces between adjacent strands of said fibrous material, said fibrous reinforcing material having a modulus of elasticity of about 400 grams per denier and a tenacity of at least 15 grams per denier at room temperature, and one or more outer layers of metal wire reinforcing material disposed about said one or more inner layers.

2. A hose as defined in claim 1 further including a flexible sheath of synthetic thermoplastic material covering said one or more outer layers of metal wire reinforcing material.

3. A hose as defined in claim 1 further including a flexible sheath of synthetic elastomeric material covering said one or more outer layers of metal wire reinforcing material.

4. A hose as defined in claim 1 wherein said fibrous reinforcing material is Kevlar, an aramid filament having a tenacity greater than 19 grams per denier at room temperature.

5. A hose as defined in claim 1 wherein said one or more inner layers of fibrous reinforcing material is applied to give less than 100% coverage.

6. A hose as defined in claim 1 where said core tube is a heat curable elastomer.

7. A hose as defined in claim 1 wherein said core tube is a thermoplastic material.

8. A hose as defined in claim 5 wherein said one or more inner layers of fibrous reinforcing material are braided.

9. A hose as defined in claim 5 wherein said one or more inner layers of fibrous reinforcing material is spirally wound.

10. A high burst strength flexible composite hose comprising a flexible core tube of synthetic material, one or more inner layers of fibrous reinforcing material applied around said core tube to give coverage of less than 100%, said fibrous reinforcing material having a modulus of elasticity of at least 400 grams per denier and a tenacity of at least 15 grams per denier at room temperature, said one or more inner layers of fibrous reinforcing material being applied at an angle between 48° and 56°, and one or more outer layers of metal wire reinforcing material applied at an angle between 50° and 58° about said one or more inner layers.

11. A hose of claim 10 wherein the fibrous reinforcement is Kevlar, an aramid having a tenacity of generally at least 19 grams per denier at room temperature.

12. A hose of claim 10 wherein the fibrous reinforcement material contributes between 3% and 40% of the total strength of the composite.

13. A hose of claim 10 further including a flexible sheath of synthetic thermoplastic material covering said one or more outer layers of metal wire reinforcing material.

14. A hose of claim 10 further including a flexible sheath of synthetic elastomeric material covering said one or more outer layers of metal wire reinforcing material.

* * * * *